United States Patent
Graf et al.

(10) Patent No.: US 11,055,605 B2
(45) Date of Patent: Jul. 6, 2021

(54) DETECTING DANGEROUS DRIVING SITUATIONS BY PARSING A SCENE GRAPH OF RADAR DETECTIONS

(71) Applicant: NEC Laboratories America, Inc., Princeton, NJ (US)

(72) Inventors: Hans Peter Graf, Lincroft, NJ (US); Eric Cosatto, Red Bank, NJ (US); Iain Melvin, Hopewell, NJ (US)

(73) Assignee: NEC Corporation

( * ) Notice: Subject to any disclaimer, the term of this patent is extended or adjusted under 35 U.S.C. 154(b) by 918 days.

(21) Appl. No.: 15/785,796

(22) Filed: Oct. 17, 2017

(65) Prior Publication Data
US 2018/0307967 A1 Oct. 25, 2018

Related U.S. Application Data

(60) Provisional application No. 62/489,539, filed on Apr. 25, 2017.

(51) Int. Cl.
| | |
|---|---|
| G06N 3/08 | (2006.01) |
| G06N 3/04 | (2006.01) |
| G01S 7/41 | (2006.01) |
| G01S 13/931 | (2020.01) |

(52) U.S. Cl.
CPC .............. G06N 3/04 (2013.01); G01S 7/417 (2013.01); G06N 3/08 (2013.01); G01S 13/931 (2013.01)

(58) Field of Classification Search
CPC .. G06N 3/04; G06N 3/08; G01S 7/417; G01S 13/931
See application file for complete search history.

(56) References Cited

U.S. PATENT DOCUMENTS

| | | | |
|---|---|---|---|
| 7,839,292 B2 | 11/2010 | Wang et al. | |
| 2010/0274430 A1* | 10/2010 | Dolgov | G01C 21/20 701/25 |
| 2012/0083960 A1* | 4/2012 | Zhu | G05D 1/0276 701/23 |
| 2013/0242284 A1* | 9/2013 | Zeng | G01S 17/66 356/4.01 |

(Continued)

OTHER PUBLICATIONS

Cook, Diane J., and Lawrence B. Holder. "Substructure discovery using minimum description length and background knowledge." Journal of Artificial Intelligence Research 1 (1993): 231-255. (Year: 1993).*

(Continued)

*Primary Examiner* — Luis A Sitiriche
*Assistant Examiner* — Casey R. Garner
(74) *Attorney, Agent, or Firm* — Joseph Kolodka

(57) ABSTRACT

A computer-implemented method executed by a processor for training a neural network to recognize driving scenes from sensor data received from vehicle radar is presented. The computer-implemented method includes extracting substructures from the sensor data received from the vehicle radar to define a graph having a plurality of nodes and a plurality of edges, constructing a neural network for each extracted substructure, combining the outputs of each of the constructed neural networks for each of the plurality of edges into a single vector describing a driving scene of a vehicle, and classifying the single vector into a set of one or more dangerous situations involving the vehicle.

20 Claims, 7 Drawing Sheets

(56) References Cited

U.S. PATENT DOCUMENTS

| | | | |
|---|---|---|---|
| 2015/0025784 A1 | 1/2015 | Kastner et al. | |
| 2017/0200061 A1* | 7/2017 | Julian | G06K 9/00791 |
| 2017/0323179 A1* | 11/2017 | Vallespi-Gonzalez | G06K 9/00805 |
| 2018/0173230 A1* | 6/2018 | Goldman-Shenhar | B60W 50/08 |
| 2019/0377354 A1* | 12/2019 | Shalev-Shwartz | B60W 30/0956 |

OTHER PUBLICATIONS

McCall, Joel C., and Mohan M. Trivedi. "Driver behavior and situation aware brake assistance for intelligent vehicles." Proceedings of the IEEE 95, No. 2 (2007): 374-387. (Year: 2007).*

Such, Felipe Petroski, Shagan Sah, Miguel Dominguez, Suhas Pillai, Chao Zhang, Andrew Michael, Nathan Cahill, and Raymond Ptucha. "Robust Spatial Filtering with Graph Convolutional Neural Networks." arXiv preprint arXiv: 1703.00792 (2017). (Year: 2017).*

Weisswange, Thomas H., Bram Bolder, Jannik Fritsch, Stephan Hasler, and Christian Goerick. "An integrated ADAS for assessing risky situations in urban driving." In 2013 IEEE Intelligent Vehicles Symposium (IV), pp. 292-297. IEEE, 2013. (Year: 2013).*

Wu, Bichen, Alvin Wan, Forrest Iandola, Peter H. Jin, and Kurt Keutzer. "SqueezeDet: Unified, Small, Low Power Fully Convolutional Neural Networks for Real-Time Object Detection for Autonomous Driving." arXiv preprint arXiv: 1612.01051 (2016). (Year: 2016).*

Xu, Yuan Xin. "Identification of Dangerous Driving Behaviors Based on Neural Network and Bayesian Filter." In Advanced Materials Research, vol. 846, pp. 1343-1346. Trans Tech Publications Ltd, 2014. (Year: 2014).*

Chen et al., "DeepDriving: Learning Affordance for Direct Perception in Autonomous Driving, " Proceedings of 15th IEEE International Conference on Computer Vision. Dec. 8, 2013. pp. 2722-2730.

Bengio et al., "Convolutional Networks for Images, Speech, and Time-Series, " The Handbook of Brain Theory and Neural Networks, MIT Press. 1995. pp. 255-258.

Socher et al., "Parsing Natural Scenes and Natural Language with Recursive Neural Networks," Proceedings of the 28th International Conference on Machine Learning. Jun. 28-Jul. 2, 2011. pp. 129-136.

Kenneth L. Campbell., "The SHRP 2 Naturalistic Driving Study: Addressing driver performance and behavior in traffic safety," Blueprints to Improve Highway Safety. TR News 282. Sep.-Oct. 2012. pp. 30-35.

* cited by examiner

DETECTING DANGEROUS DRIVING SITUATIONS BY PARSING A SCENE GRAPH OF RADAR DETECTIONS

RELATED APPLICATION INFORMATION

This application claims priority to Provisional Application No. 62/489,539, filed on Apr. 25, 2017, incorporated herein by reference in its entirety.

BACKGROUND

Technical Field

The present invention relates to neural networks and, more particularly, to a trainable scene parsing neural network for long range traffic danger prediction from radar sensor data.

Description of the Related Art

A driver has an unconscious and immediate sense of various conditions through objects in view and, as a case may be, he/she must take action to evade any possible crash or collision. However, drivers often panic at an emergency. Such a panicked driver may sometimes be the last one who can cope with the emergency to ensure safety of the vehicle. Besides, a response delay to stimuli in varying degrees is inherent to human beings, so that it is impossible in some cases to evade a crash or danger by physical considerations. In this respect, various techniques have been developed to evade a collision by mounting on a vehicle a system for determining a possibility of crash before it happens.

SUMMARY

A computer-implemented method for training a neural network to recognize driving scenes from sensor data received from vehicle radar is presented. The method includes extracting substructures from the sensor data received from the vehicle radar to define a graph having a plurality of nodes and a plurality of edges, constructing, by a constructing module, a neural network for each extracted substructure, combining, by a combining module, the outputs of each of the constructed neural networks for each of the plurality of edges into a single vector describing a driving scene of a vehicle, and classifying, by a classifying module, the single vector into a set of one or more dangerous situations involving the vehicle.

A system for training a neural network to recognize driving scenes from sensor data received from vehicle radar is presented. The system includes a memory and a processor in communication with the memory, wherein the processor is configured to extract substructures from a graph defining a plurality of nodes and a plurality of edges, construct a neural network for each extracted substructure, combine the outputs of each of the constructed neural networks for each of the plurality of edges into a single vector describing a driving scene of a vehicle, and classify the single vector into a set of one or more dangerous situations involving the vehicle.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In one aspect, the method, system, and non-transitory computer-readable storage medium include a trainable scene parsing neural network for long range traffic danger prediction from radar sensor data. The systems and methods take as input a graph describing a scene such as a set of radar detections (e.g., vehicles), and then classify the scene into one of many predetermined or predefined dangerous situations. The systems and methods can be extended to include more than radar sensor data, such as, but not limited to, map information and/or automobile telemetry data.

In one aspect, the method, system, and non-transitory computer-readable storage medium include predicting traffic danger beyond the immediate future. The neural network architecture used for classification of the situation is constructed at runtime from trained components according to a structure of the graph of radar (vehicle) detections. This is similar to the way a parsing neural network can be used to recursively parse words and their derived combinations in order to understand a meaning of a sentence.

In one aspect, the method, system, and non-transitory computer-readable storage medium include borrowing methods from natural language processing to "parse" a scene by first processing all possible subsets of raw, untransformed (full fidelity) input in a similar way to a language processing network starting by applying a network to process all neighboring words. Then the results from all subsets are combined into a classification of the whole. In other words, the network starts by inspecting relationships between small subsets of detections with all available "full resolution" information, and assessing those subsets for dangerous configurations before combining the results from all subsets into a classification for all detections.

Figure 1:
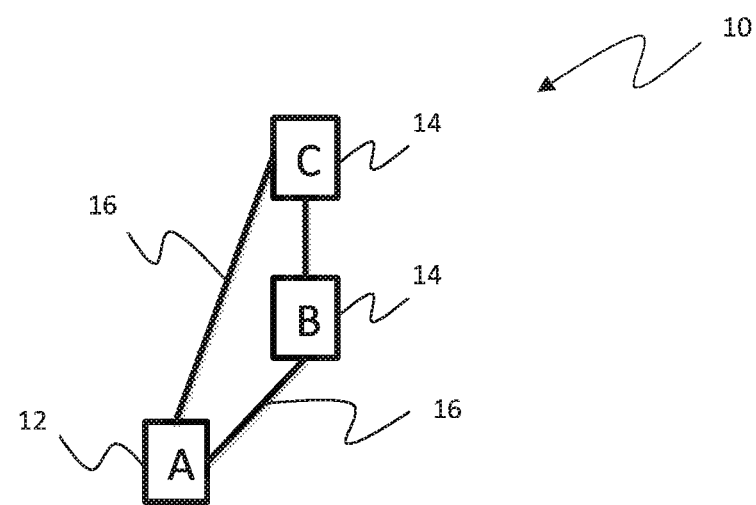
FIG. 1 is a block/flow diagram of a set of radar detections, in accordance with embodiments of the present invention.

Regarding FIG. 1, traffic scenes (TS) 10 are described by a set of radar detections (RD), e.g., vehicles such as cars, trucks, bikes, and even pedestrians, etc., and information about (e.g., speed) of the driving vehicle. The radar detections can be referred to as nodes. An initial node 12 can be a vehicle A. The vehicle A can be driving down a road. Other nodes 14 can be detected by the initial node 12. The other nodes 14 can also be vehicles B, C. The relationship between the initial node 12 and the other nodes 14 can be designated as 16. The relationship can refer to or represent information derived from, e.g., a distance between vehicles A, B, and C and/or a speed of vehicles A, B, C relative to each other.

A driving danger prediction system is realized by continuously matching a current TS to a codebook of (or predetermined or predefined or pre-established) TSs that have been identified as leading to dangerous situations. When a match occurs, a warning can be transmitted to the driver. The exemplary invention describes how to fit an end-to-end scene parsing neural network learning approach (e.g., a graph network) to the challenge of matching TSs.

The exemplary embodiments combine radar, video, global positioning system (GPS), map, driver-status, traffic and weather information to represent a driving situation in a top-view map representation including a graph of static elements (e.g., road, signs, etc.) and traffic participants. The GPS unit of the car is used to position the driving vehicle on the map that includes information about roads, intersections, etc. A radar module can detect and track position and velocities of a number of objects relative to the driving car. These objects (e.g., position and velocities) are then placed on a map. Video information may be used to improve accuracy of the positioning by using lane detection or structure from motion. In addition, the video may be used to recognize the type of objects (e.g., car, pedestrian, static obstacle) detected by the radar. Furthermore it may also be used to recognize traffic signage, as well as other elements within the environment.

The map representation is then converted into a graph where vertices are the traffic participants (TPs) as well as the static elements (SE) and the edges represent the relationship between pairs of TPs/SEs. Vertices and edges include attributes describing their nature and characteristics. Vertices' attributes may include a type of object they represent (e.g., car, truck, pedestrian, etc.), intrinsic parameters (e.g., physical characteristics of cars, width of road lanes, mental status of driver, etc.), and also global information (e.g., weather, traffic, etc.). Edge attributes may include relations, such as action types (e.g., 'driving on', 'approaching', etc.), relative position, speed and/or acceleration. Attributes can be either actual values or ranges of values. Such map-view graph representations can be compact and well suited for comparison purposes and queries.

Therefore, in the exemplary embodiments of the present invention, the set of detections that form observations of the driving or traffic scene are treated as a graph. The graph can be defined as a set of nodes (e.g., vehicles) and edges (e.g., relationship between the vehicles). One or more nodes can also represent persons.

Figure 2:
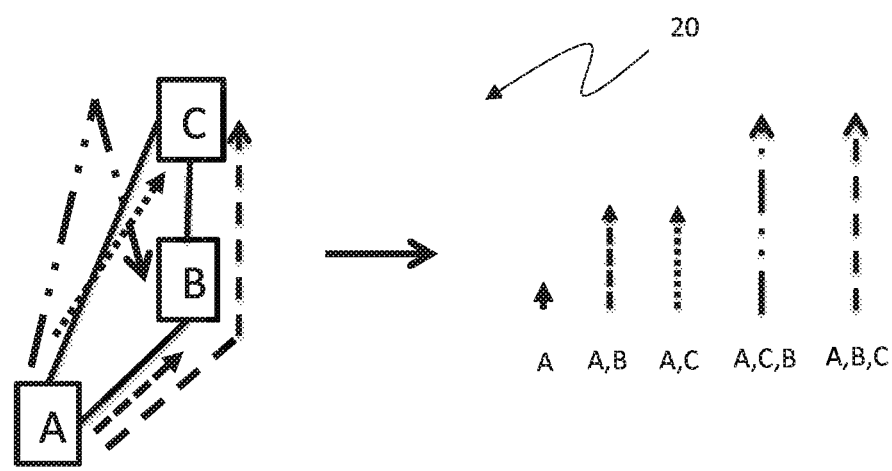
FIG. 2 is a block/flow diagram for extracting a plurality of edges (paths) from a graph, in accordance with embodiments of the present invention.

Referring to FIG. 2, a set of substructures 20 is extracted from the graph. In particular, all paths through the graph starting from an initial vehicle and visiting all other detections in the graph up to a maximum depth are extracted. Another implementation can be related to extracting subtrees from the graph. In particular, relationships are derived between vehicles A and B, between vehicles A and C, between vehicles A, C, B, and between vehicles A, B, C. Thus, the paths 16 (FIG. 1) enable the extraction of data and/or information between nodes of a graph.

Figure 3:
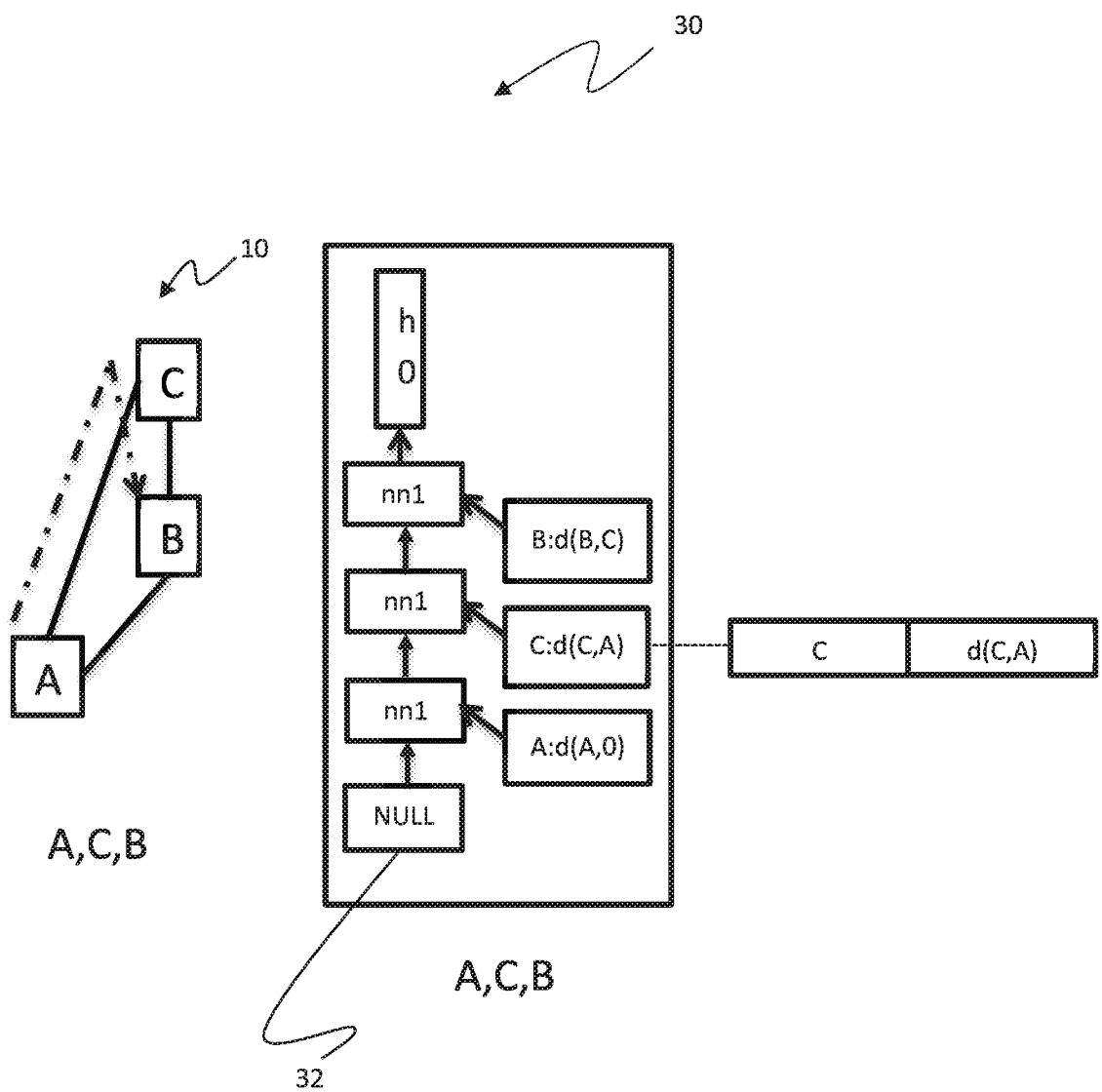
FIG. 3 is a block/flow diagram for constructing a neural network for a path through a graph, in accordance with embodiments of the present invention.

Referring to FIG. 3, a neural network 30 is constructed for each extracted substructure (e.g., path). The neural network 30 can be constructed by a construction module. These networks are constructed by using the same neural network building blocks at each step through the graph. The input at each step includes at least one of the following inputs: (1) A previous output of the neural network. Note for the first step in a path where there is no previous car, a "NULL" bias vector 32 is inputted, which is learned during training. (2) A set of known information (e.g., position, velocity, etc.) about each node (e.g., vehicle). (3) A set of differential information comparing a current car to a previous car. (e.g., difference in velocity). In FIG. 3, element C=(pos, vel) of current car (pos, vel) and element d(C,A)=differences to the previous car {Cpos−Apos, Cvel−Avel, etc.).

Figure 4:
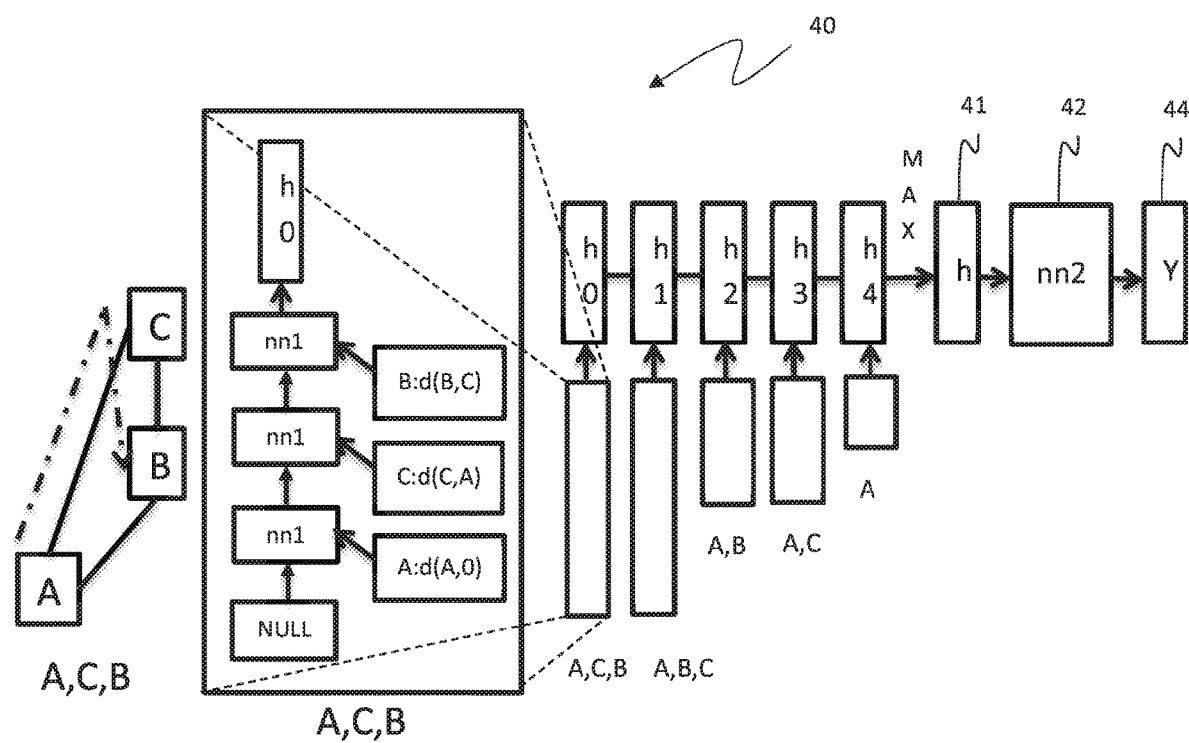
FIG. 4 is a block/flow diagram for concatenating outputs of constructed neural networks for all paths and combining them into a single vector, in accordance with embodiments of the present invention.

Referring to FIG. 4, outputs 40 of the networks for all paths are then concatenated together [h0, h1, h2, h3, h4]. Subsequently, the outputs are combined by the use of a, e.g., MAX function into a single vector h (41) which allows all the networks to contribute signals (e.g., detected features) to a final classifying neural network nn2 (42) that can classify the whole scene into one of many dangerous situations Y (44), where Y is a vector of numbers, each number corresponding to a probability of a particular "dangerous situation" being present in a whole scene.

The classifier system thus includes a method of extracting substructures from a graph that can be implemented as neural networks, feeding information from the graphs about the nodes and edges to these neural networks, combining all outputs of these neural networks into one vector describing the scene, and classifying that vector into one (or more) of a set of dangerous situations. The classifying can be executed by a classification module. The outputs can be combined by a combining module. Moreover, a notification or warning can be sent to the driver regarding the detected possible dangerous condition or situation or event or occurrence.

The notification can be, e.g., sounding an audible alert, sounding a 3D-localized audible alert to attract the drivers attention to a location of the potential danger, sounding a voice alert telling the driver about the danger, displaying a warning message on a dashboard, displaying a warning message on a windshield via hologram, projecting a highlight on the windshield or side windows via hologram to locate the traffic participants involved in the dangerous situation, vibrating a steering wheel, brakes, accelerator or seat, acting on the ability of the driver to accelerate, and/or acting on the brakes.

Figure 5:
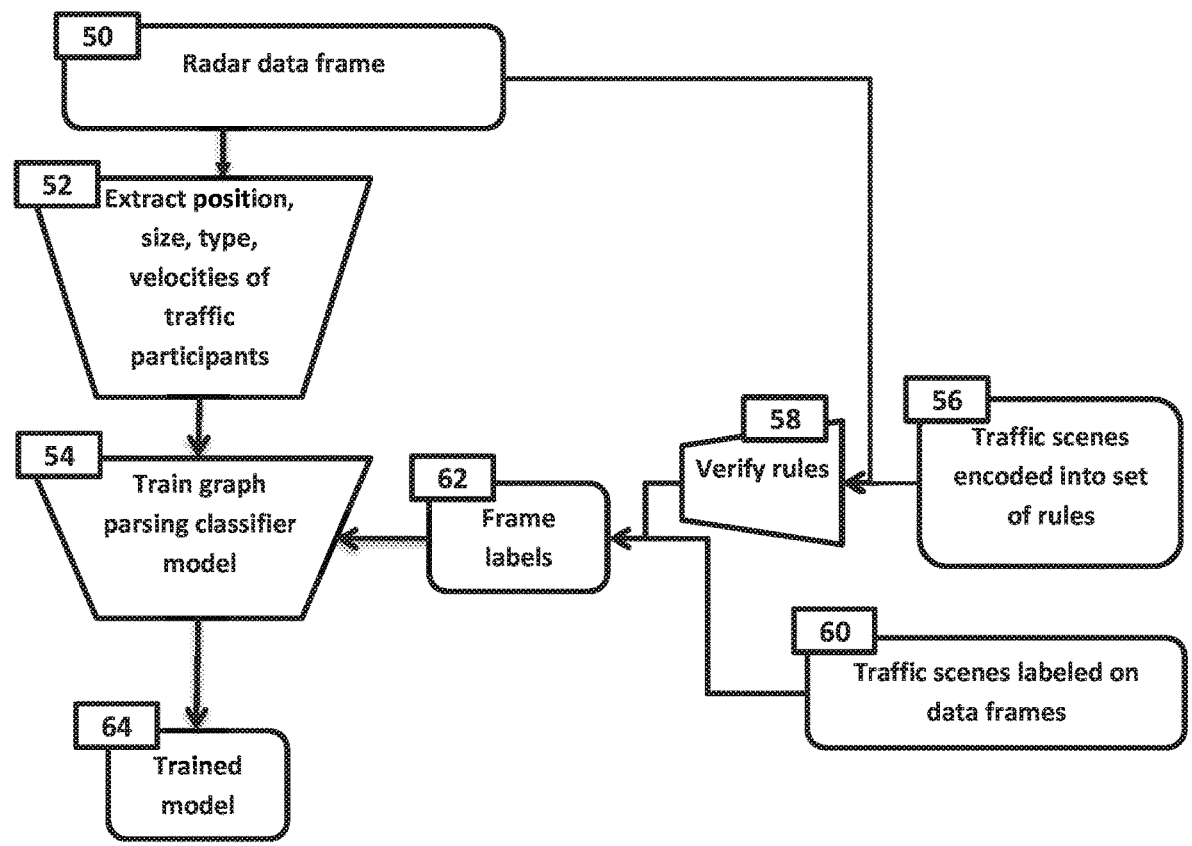
FIG. 5 is a block/flow diagram illustrating a neural network training system for training a neural network to recognize driving scenes from sensor data, in accordance with embodiments of the present invention.

Additionally, the classifier described herein needs data to be trained and is trained as part of a larger system described in FIG. 5.

FIG. 5 is a block/flow diagram illustrating a neural network training system for training a neural network to recognize driving scenes from sensor data, in accordance with embodiments of the present invention.

Data arrives into the system from radar sensor frame data 50 obtained dynamically at regular synchronized sampling intervals from a vehicle radar. The TP feature map extractor 52 uses sensors to extract a position, size, type, and velocities of traffic participants (TPs). Specialized automotive radar units are capable of extracting positions and velocities of several TPs concurrently.

As with all supervised learning approaches, a training set 54 of labeled examples needs to be created. When dealing with a neural network, it needs to be ensured that a sufficient number of training examples 64 are used to train the network, so that it can generalize adequately. Hence, the present invention also describes an approach to generate large amounts of labeled sensor frame data from recorded naturalistic driving datasets.

For all TSs that are to be detected, a set of constraints on the sensor data variables are initially defined. For example, a set of constraints for a particular TS would be: the driving vehicle's speed should be above 100 km/h, there should be a car in front at less than 30 m and that car's relative speed should be negative. That kind of description is a natural way to define a particular TS, yet can also be easily transcribed into computer code, resulting in a list of coded rules for each TS 56. For each data frame 60, the variables of corresponding sensors are fed to the rule verification module 58. When all rules describing a TS are verified, the data frame is labeled 62 as belonging to that TS, otherwise a negative label is given to the data frame. The output layer of the convnet has as many outputs as the number of traffic scenes (TSs) to be recognized.

Figure 6:
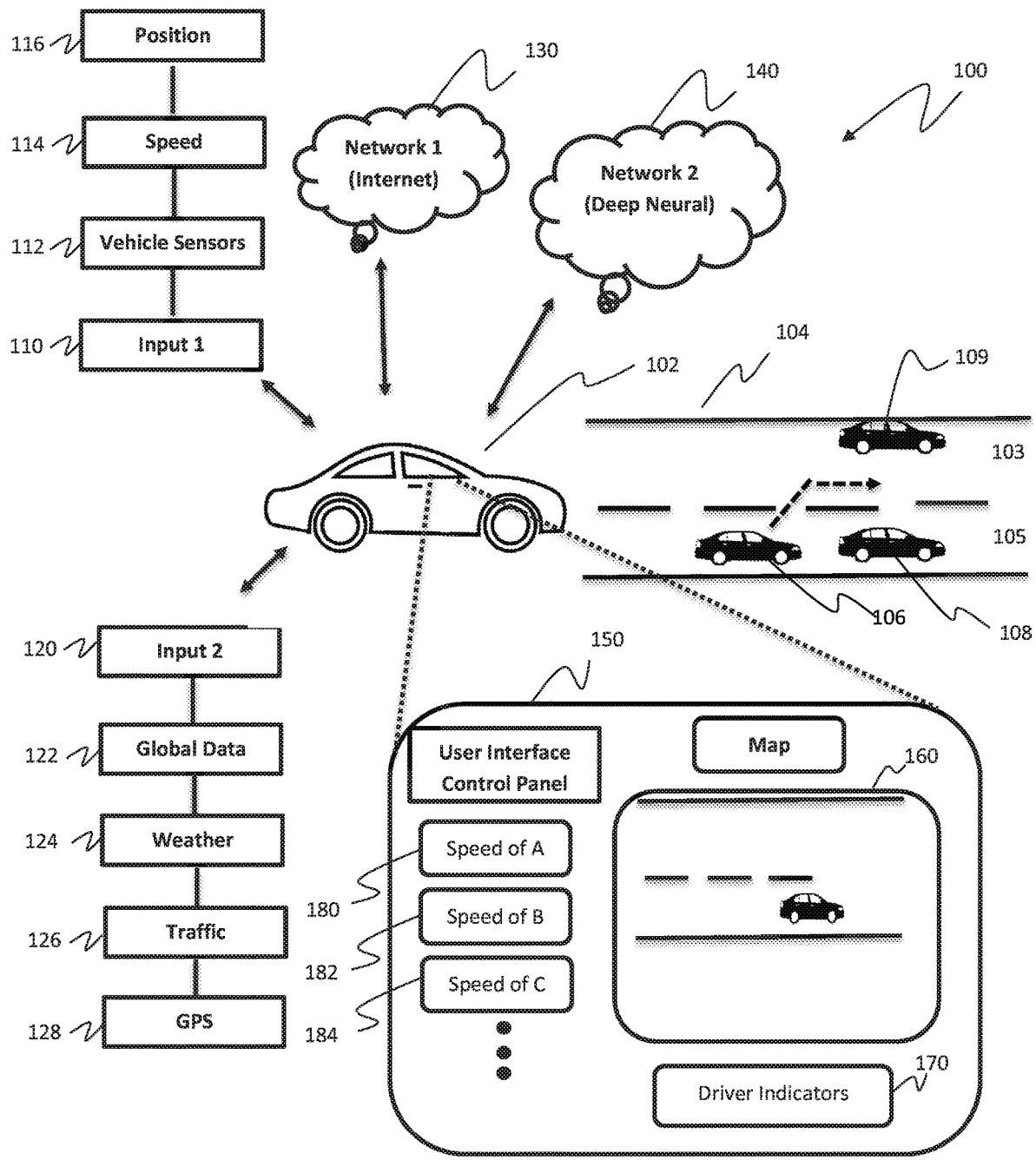
FIG. 6 is a block/flow diagram of a user interface (UI) of a vehicle illustrating a dangerous situation on the road ahead, in accordance with embodiments of the present invention.

FIG. 6 is a block/flow diagram of a user interface (UI) of a vehicle illustrating a dangerous situation on the road ahead, in accordance with embodiments of the present invention.

System 100 includes a first vehicle 102 (vehicle A). The vehicle 102 is driving down a road 104. On the road 104, vehicle 102 encounters a second vehicle 106 (vehicle B), a third vehicle 108 (vehicle C), and a fourth vehicle 109 (vehicle D). The second and third vehicles 106, 108 are driving within lane 105, whereas the fourth vehicle 109 is driving in lane 103. User interface control panel 150 of the vehicle 102 indicates a special situation (e.g., a dangerous situation) to the driver of the vehicle 102. For example, it is detected from a traffic scene (TS) that the second vehicle 106 is attempting to pass the third vehicle 108 via lane 103 where the fourth vehicle 109 is also detected close by. The driver of vehicle 106 may have made a sudden move to pass vehicle 108, even though vehicle 109 is basically adjacent to vehicle 108. This could lead to a dangerous situation, such as an accident caused by the second vehicle 106.

The driver of vehicle 102 can view this special situation on a map 160 positioned somewhere within the vehicle 102. The user interface control panel 150 can display a plurality of different data and/or information to the driver of the vehicle 102. For example, a speed 180 of vehicle A can be displayed relative to a speed 182 of vehicle B and a speed 184 of the vehicle C. Of course, one skilled in the art can contemplate displaying a plurality of other information to the user (e.g., position information related to each vehicle A, B, C, D, etc.). The user interface control panel 150 can further display a plurality of indicators 170. The indicators 170 can be warning indicators, notifications indicators, alarm indicators, etc. The indicators 170 can be light emitting diodes (LEDs). The indicators 170 can display text. One skilled in the art can contemplate a plurality of different types of indicators.

The vehicle 102 can receive a plurality of inputs. For example, the first input 110 can include sensor inputs, such as vehicle sensors 112, speed/velocity sensors 114, and/or position sensors 116. Of course, other sensors can also be included for detecting and/or monitoring a plurality of other variables and/or parameters. Moreover, the vehicle 102 can receive second inputs 120, including, but not limited to, global data 122, weather information 124, traffic information 126, and/or global positioning system (GPS) data 128. Data and/or information can also be collected from one or more video cameras mounted on or within the vehicle 102 or from one or more video cameras in a vicinity of the vehicle 102 (e.g., within the immediate environment).

The vehicle 102 can further receive data and/or information from a plurality of networks. For example, the vehicle 102 can receive data from a first network 130 (e.g., Internet) and a second network 140 (e.g., a deep convolutional neural network). One skilled in the art can contemplate a plurality of other networks for communicating with the vehicle 102.

Figure 7:
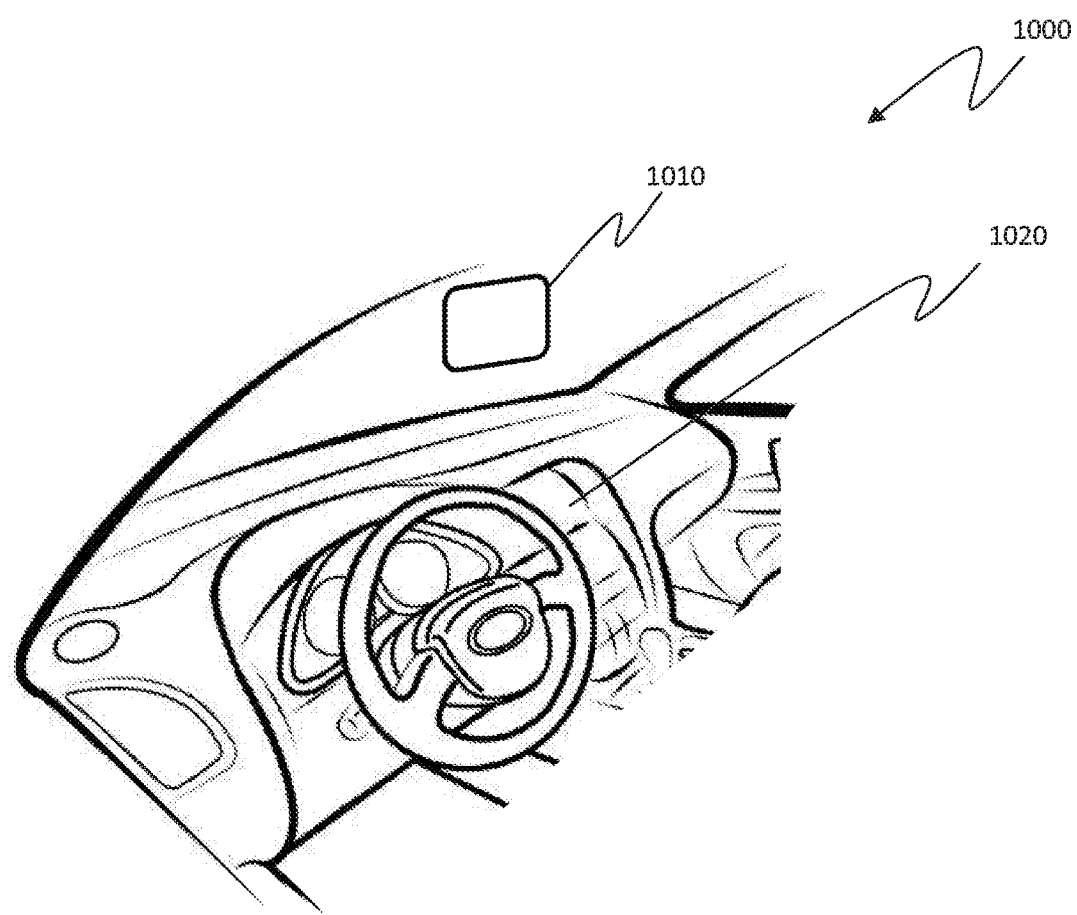
FIG. 7 is a block/flow diagram of an interior of an automobile depicting a navigation device mounted on a windshield or incorporated within a dashboard and/or console area, in accordance with embodiments of the present invention.

FIG. 7 is a block/flow diagram of an interior of an automobile depicting a navigation device mounted on a dashboard or incorporated within a dashboard and/or console area, in accordance with embodiments of the present invention.

The car interior 1000 depicts a navigation device 1010 mounted around or in proximity to a windshield area of the car. The car interior 1000 also depicts a navigation device 1020 incorporated within one or more console areas of the car. It is contemplated that the navigation devices 1010, 1020 can be incorporated or positioned on any interior portion of the car interior 1000.

Figure 8:
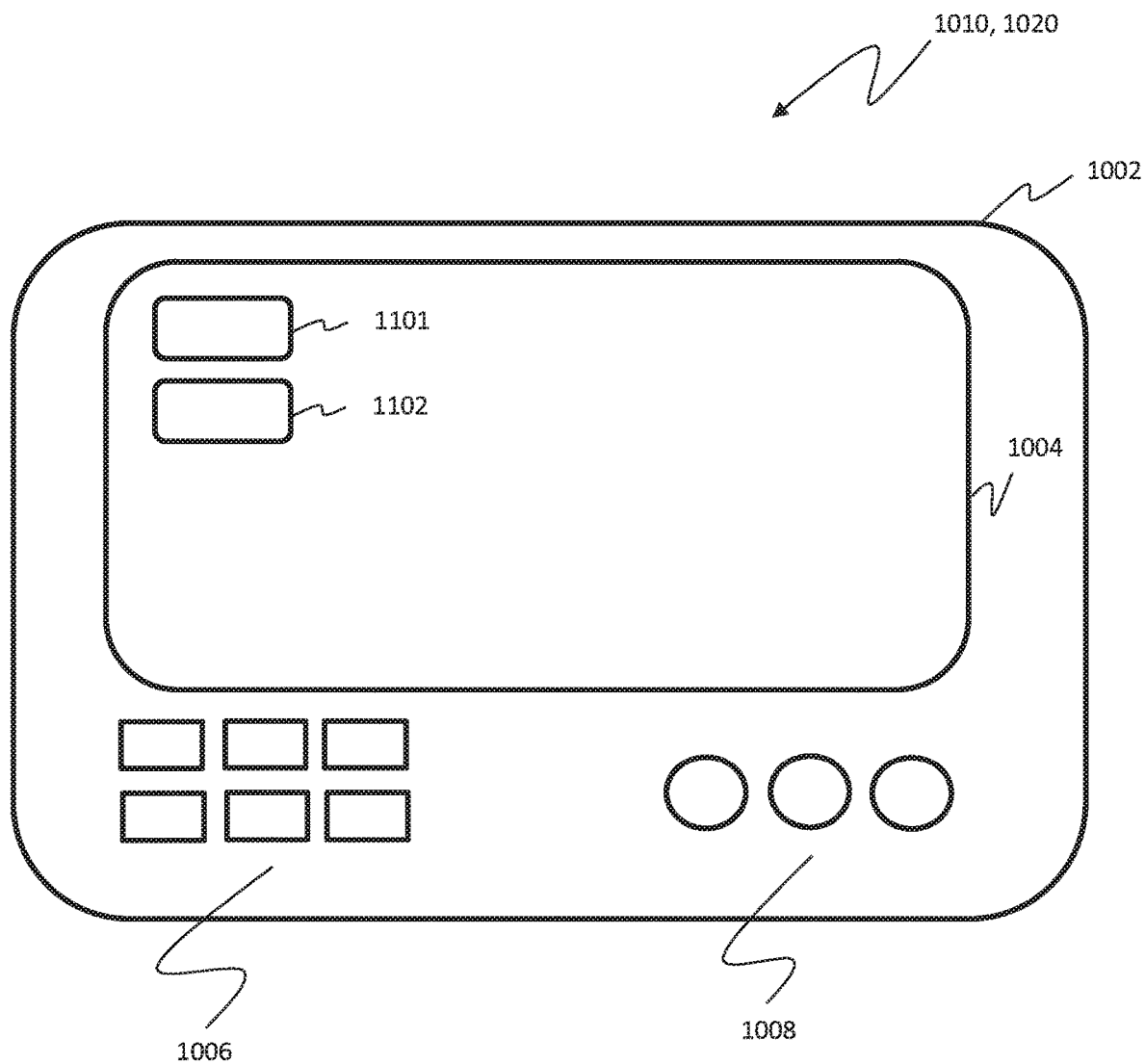
FIG. 8 is a block/flow diagram of the navigation device of FIG. 6 including a video camera for predicting one or more dangerous driving situations while a user drives the car, in accordance with embodiments of the present invention.

FIG. 8 is a block/flow diagram of the navigation device of FIG. 6 including a video camera for predicting driving situations while a user drives the car, in accordance with embodiments of the present invention.

The navigation devices 1010, 1020 can include a housing 1002 having a display screen 1004. The display screen 1004 can be, e.g., a light emitting diode (LED) display or an organic light emitting diode (OLED) display. The navigation devices 1010, 1020 can further include a plurality of control buttons 1006. The navigation devices 1010, 1020 can further include a plurality of indicators 1008. Additionally, a video camera 1101 and a global positioning system (GPS) 1102 can be incorporated with the navigations devices 1010, 1020.

The navigation devices 1010, 1020 can be portable and compatible with a number of different vehicles. Portable devices brought into a vehicle by, for example, a guest, who may not be the primary user of the vehicle, may also wirelessly communicate with the car system. Car systems may wirelessly communicate with the portable device by way of, e.g., a Bluetooth communication link. Conventional protocols for establishing a communication link via Bluetooth may first pair the system with the portable device by using a pin code to authenticate the portable device requesting the wireless connection. Once the pin code is authenticated and a media access control (MAC) address is saved by both the car system and the portable device, pairing is complete and the car system and the portable device can automatically establish wireless communication when the two are within communication range (e.g., the portable device is brought into the car).

The navigation devices 1010, 1020 can be attachable and/or detachable to different parts of the car. For example, the navigation devices 1010, 1020 can be attached to various portions of the center console or dashboard.

The navigation devices 1010, 1020 can operate with a car power system. The car power supply system provides i) power to crank start an engine through a starter motor and ii) continuous supply to vehicle systems either from a battery or from an alternator driven by the engine. This keeps the vehicle functioning through various controls and helps provide electrical command signals to respond to driver inputs and to satisfy passenger needs during usage of the vehicle. The power supply is of low voltage DC and is provided by a combination of a rechargeable lead acid battery and an alternator with an in-built rectifier and voltage regulator. The nominal voltage of the supply is normally 12 volts DC in cars and 24 volts on commercial vehicles.

The positive terminals of the battery and of the alternator are joined and/or connected to form a power supply positive terminal bus for the vehicle and power can be drawn through the bus from both sources or from either one of the sources. The power is distributed to various loads picking off power from the bus. The negative terminal of the supply system is connected to the body or chassis of the vehicle and the return lines from the loads placed at different locations on the vehicle are terminated at grounding studs welded or fitted at suitable locations on the vehicle body or chassis. The return currents from the different loads are returned to the negative terminals of the battery and the alternator through the body or chassis of the vehicle. The navigation devices 1010, 1020 can receive multiple inputs from the car power system described to monitor various components of the car power system.

The navigation devices 1010, 1020 can operate with any other components of the car. The navigation devices 1010, 1020 can receive input from any of the car components. For example, any car cameras or sensors or GPS units can provide their data and/or information to the navigation devices 1010, 1020. Additionally, braking system components, engine components, engine cooling system components, engine oil system components, fuel supply components, suspension and steering component systems, and/or transmission system components can be configured to electrically communicate with the navigation devices 1010, 1020 for maintaining optimal performance during detection of a special situation.

The navigation devices 1010, 1020 can operate with a controller employed to control the activation of a countermeasure system. Each countermeasure may have an individual actuator associated therewith. In that case, the controller may direct the individual countermeasure actuator to activate the countermeasure. Various types of countermeasure systems will be evident to those skilled in the art. Examples of a countermeasure within countermeasure system include occupant belt pre-tensioning, bumper height changing including nose dipping, braking, the pre-arming of internal airbags, the deployment of exterior or internal airbags, pedal control, steering column position, head restraint and knee bolster control. Preferably, the controller is programmed to activate the appropriate countermeasure in response to the inputs from the various sensors or from the navigation devices 1010, 1020.

The navigation devices 1010, 1020 can operate with braking system conditions sensors. Braking system conditions may be a sensor or sensors such as a brake pedal position sensor or a brake pressure monitor. The brake system conditions may be used to determine occupant driving characteristics and therefore provide an improved collision prediction and as a result provide an improved countermeasure deployment decision.

Therefore, exemplary embodiments of the present invention can be incorporated within a vehicle, such as an automobile, motorcycle, etc. The exemplary embodiments of the present invention can be represented or displayed on a user interface (UI) within a vehicle. The UI can provide data and/or information to the driver of the vehicle in real-time and on a continuous or periodic basis. The data and/or information can be related to a plurality of different variables or parameters detected and/or monitored, either within the immediate vicinity or environment of the vehicle or from external sources. In one aspect, traffic scenes (TSs) are recognized and compared to predetermined or predefined TS s in order to predict dangerous situations ahead of time.

In summary, a method and system for training a neural network to recognize complex traffic scenes from radar sensor data is presented. The set of radar detections is treated as a graph between detections and the architecture of the neural network is determined by extracting substructures from the graph of radar detections. These substructures can be paths through the graph, but could be trees or other substructures of the graph. It is also possible to reduce the set of possible substructures to only those paths that go through neighboring detections or to observe only combinations of interest.

The substructures of the neural network are built at test time by duplicating a common neural network nn1 (FIG. 4) at all nodes of the substructures. The input to these substructures is determined by the values at the nodes (radar detections) of the graph (FIG. 1) and by the information on the edges (differences in position and velocity between radar detections) to previous nodes. The input to the first node of every substructure can be a bias vector that is learned at training time. The substructure neural networks are joined together by, e.g., a "MAX" function and a normal neural network appended that classifies the whole scene into one of many dangerous situations. The training data can be labeled semi-automatically by (i) for each label, defining a set of constraints on sensory variables and encode them into a set of computer rules and (ii) sensor data frames for which all rules are verified and are assigned the corresponding label. The max function pools features output from the substructures of the neural network. The substructure networks are independent and extract features for dangerous situation detection of structures between small fixed subsets of cars or vehicles using the available information at full fidelity.

In conclusion, long range warnings about impending dangerous driving situations could lead to a reduction in accidents. Collision warning systems provide an added security, however, they can only be engaged at the last moment, when it is often too late. By identifying a dangerous situation ahead of time, as in the current exemplary embodiments, the system has time to warn the driver or slow down the vehicle over a longer period of time, thus avoiding sudden evasive maneuvers which are inherently dangerous.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules. The terms "block" and "module" can be interchangeable herein.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for training a neural network to recognize driving scenes from sensor data received from vehicle radar, the method comprising:
   extracting substructures from the sensor data received from the vehicle radar to define a graph having a plurality of nodes and a plurality of edges, each of the substructures being a path from an initial node through one or more detected nodes up to a maximum predetermined depth;
   constructing, by a construction module, a neural network for each extracted path, an initial point of each constructed neural network being a NULL bias vector learned during training;
   concatenating the outputs of each of the constructed neural networks for each of the plurality of edges into a single vector describing a driving scene of a vehicle; and classifying, by a classifying module, the single vector into a set of one or more driving scene situations involving the vehicle represented as a vector of numbers, each number corresponding to a probability of a particular driving scene situation being present in the driving scene.

2. The method of claim 1, wherein the plurality of nodes are vehicles and/or persons, and the plurality of edges are relationships between vehicles and/or persons.

3. The method of claim 1, wherein the graph is a set of detections that form observations of the driving scene.

4. The method of claim 1, wherein each constructed neural network includes known information and differential information.

5. The method of claim 1, wherein the outputs of the neural networks corresponding to each extracted substructure are concatenated by a component-wise operator to result in a single output vector.

6. The method of claim 5, wherein the component-wise operator is a maximum operator.

7. The method of claim 1, wherein the classification is performed by a neural network.

8. The method of claim 1, wherein the sensor data are obtained from a radar detection unit providing relative positions and velocities of traffic participants.

9. The method of claim 1, wherein the neural network for each node is duplicated from a single neural network and connected in a manner where a neural network output of a given node feeds into a neural network input of a next node, in combination with a set of known information at the node.

10. The method of claim 9, wherein the neural network input at each node further receives a set of differential information comparing the information at the node to that at a previous node.

11. The method of claim 1, wherein the driving scenes are continuously compared with predetermined driving scenes identified as leading to driving scene situations.

12. The method of claim 11, wherein a notification to an initial node of the plurality of nodes is transmitted upon occurrence of a match between a current driving scene and a predetermined driving scene.

13. A system for training a neural network to recognize driving scenes from sensor data received from vehicle radar, the system comprising:
a memory; and
a processor in communication with the memory, wherein the processor is configured to:
extract substructures from the sensor data received from the vehicle radar to define a graph having a plurality of nodes and a plurality of edges, each of the substructures being a path from an initial node through one or more detected nodes up to a maximum predetermined depth;
construct, by a construction module, a neural network for each extracted path, an initial point of each constructed neural network being a NULL bias vector learned during training;
concatenate the outputs of each of the constructed neural networks for each of the plurality of edges into a single vector describing a driving scene of a vehicle; and
classify, by a classifying module, the single vector into a set of one or more driving scene situations involving the vehicle represented as a vector of numbers, each number corresponding to a probability of a particular driving scene situation being present in the driving scene.

14. The system of claim 13,
wherein the plurality of nodes are vehicles and/or persons, and the plurality of edges are relationships between vehicles and/or persons; and
wherein the graph is a set of detections that form observations of the driving scene.

15. The system of claim 13, wherein each constructed neural network includes known information and differential information.

16. The system of claim 13, wherein the outputs of the neural networks corresponding to each extracted substructure are concatenated by a component-wise operator to result in a single output vector.

17. The system of claim 16, wherein the component-wise operator is a maximum operator.

18. The system of claim 13, wherein the classification is performed by a neural network.

19. The system of claim 13, wherein the sensor data are obtained from a radar detection unit providing relative positions and velocities of traffic participants.

20. The system of claim 13,
wherein the neural network for each node is duplicated from a single neural network and connected in a manner where a neural network output of a given node feeds into a neural network input of a next node, in combination with a set of known information at the node; and
wherein the neural network input at each node further receives a set of differential information comparing the information at the node to that at a previous node.

* * * * *